J. C. LINDSEY.
GAGED LAWN EDGER.
APPLICATION FILED SEPT. 10, 1909.
954,747.
Patented Apr. 12, 1910.
2 SHEETS—SHEET 1.
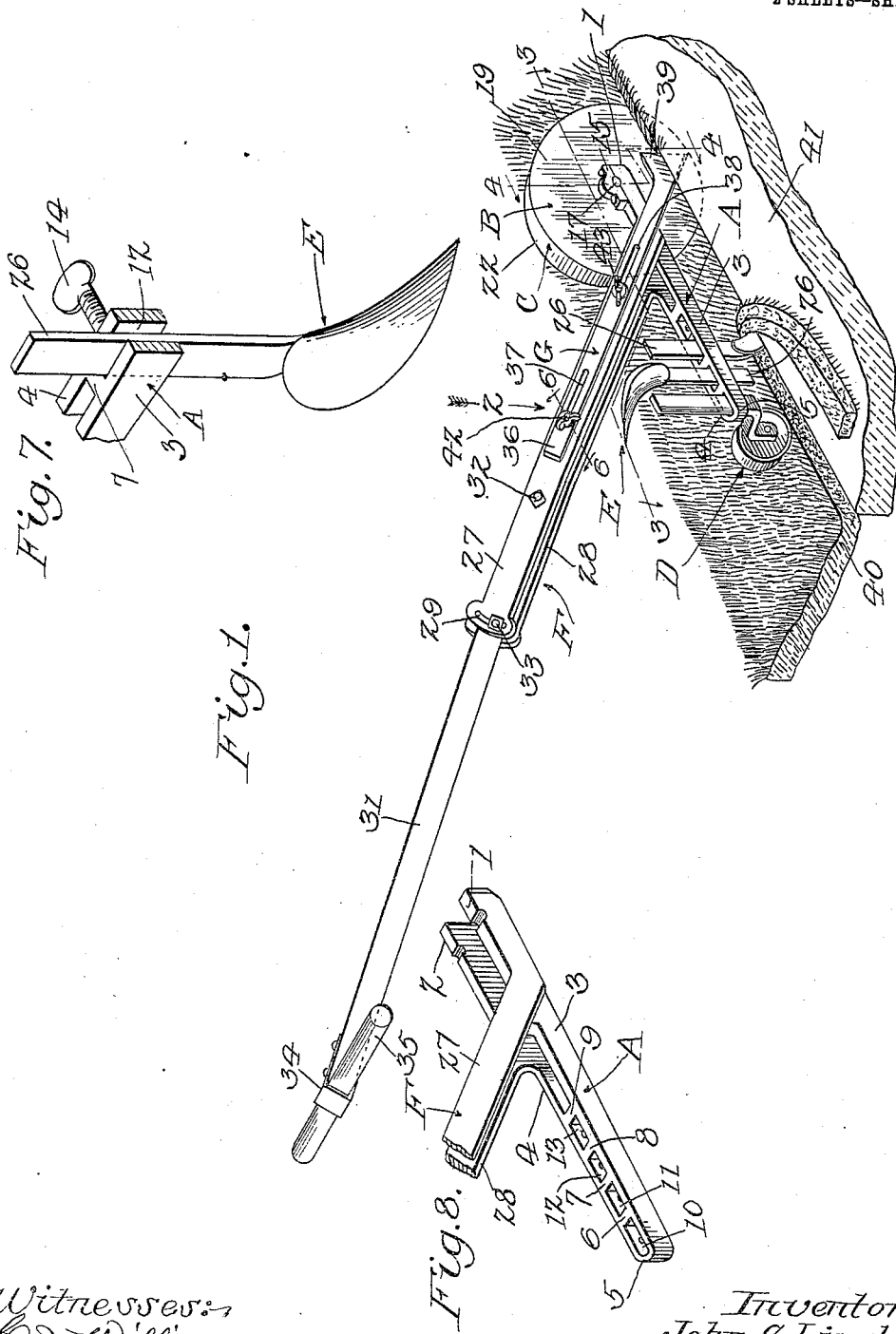
Inventor,
John C. Lindsey.

J. C. LINDSEY.
GAGED LAWN EDGER.
APPLICATION FILED SEPT. 10, 1909.
954,747.
Patented Apr. 12, 1910.
2 SHEETS—SHEET 2.
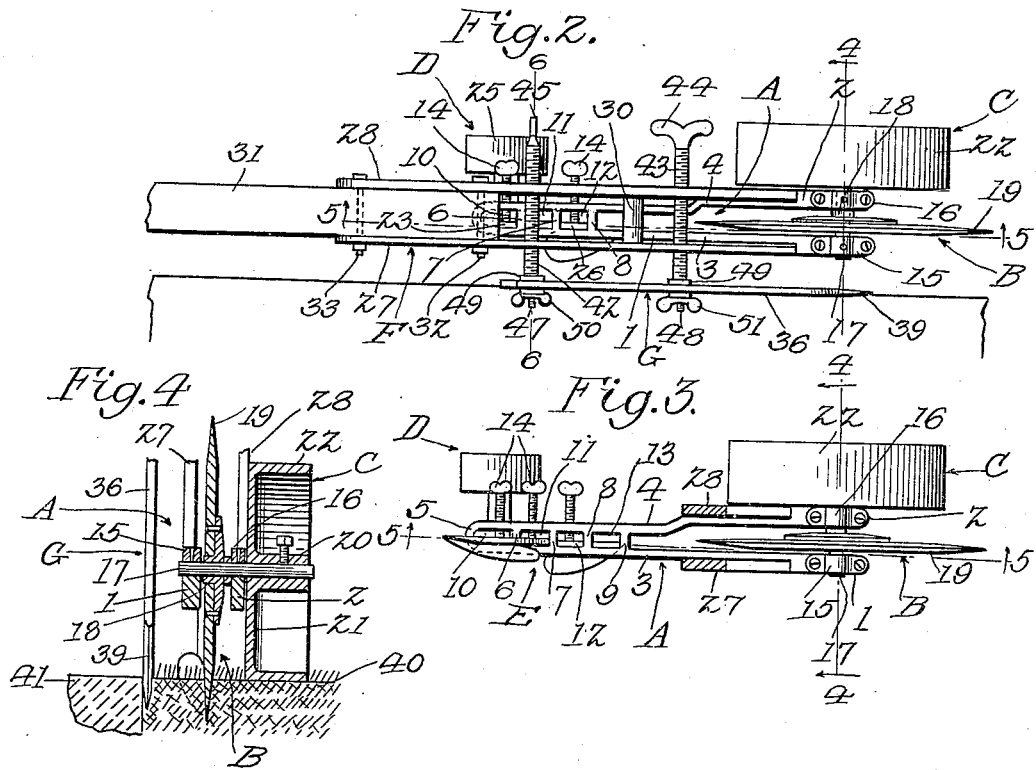
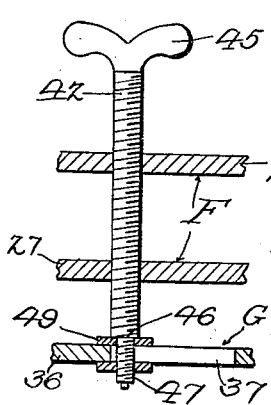
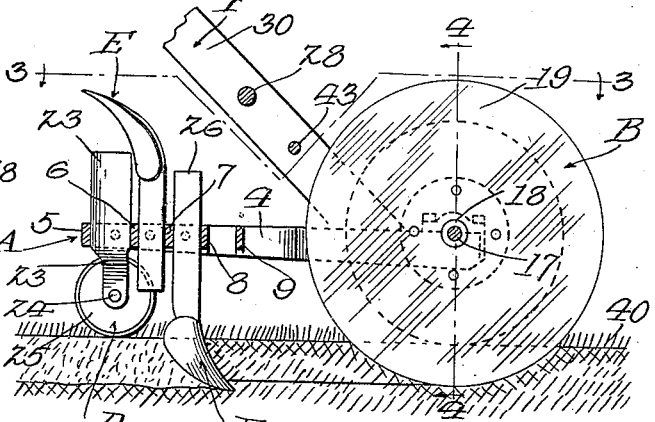
Witnesses:
Inventor,
John C. Lindsey.
By Semer G. Wells,
Attorney.

UNITED STATES PATENT OFFICE.

JOHN C. LINDSEY, OF LOS ANGELES, CALIFORNIA.

GAGED LAWN-EDGER.

954,747.  Specification of Letters Patent.  Patented Apr. 12, 1910.

Application filed September 10, 1909. Serial No. 517,035.

*To all whom it may concern:*

Be it known that I, JOHN C. LINDSEY, a citizen of the United States, residing at Los Angeles, California, have invented a new and useful Gaged Lawn-Edger, of which the following is a specification.

My principal object is to construct a machine in the nature of a plow for trimming the edges of lawn turf, so as to prevent the turf from spreading or washing over the sidewalk, and My invention includes: A, a plow-beam. B, a rolling-colter at the forward end of the plow-beam. C, a gage-wheel fixed upon the axle of the rolling-colter and upon the turf side. D, an adjustable trailer-wheel at the rear end of the plow-beam. E, interchangeable plow-shares for the plow-beam. F, a handle for the plow-beam. G, an adjustable standing-colter and guide adapted for following the edge of the side-walk.

Figure 1 is a perspective of a gaged lawn edger embodying the principles of my invention. Fig. 2 is a top plan view upon an enlarged scale, the handle being broken away. Fig. 3 is a horizontal section on the line 3—3 of Figs. 1 and 5. Fig. 4 is a vertical cross-section on the line 4—4 of Figs. 1, 2, 3 and 5. Fig. 5 is a vertical longitudinal section on the line 5—5 in Figs. 2, 3, and 4. Fig. 6 is a cross-section through the handle on the line 6—6 in Figs. 1 and 2. Fig. 7 is a cross-section perspective through the plow-beam on the line 7—7 in Figs. 1, 3 and 5. Fig. 8 is a fragmentary perspective of the plow-beam and handle casting.

The plow-beam A comprises the two half-bearing-blocks 1 and 2, the straight side-bar 3 extending backwardly from the block 1, the offset side-bar 4 extending backwardly from the block 2, the cross-pieces 5, 6, 7, 8 and 9 connecting the rear halves of the side-bars 3 and 4 and forming the vertical standard-sockets 10, 11, 12 and 13; the forward halves of the side-bars being wider apart than the rear halves, and there being set-screws 14 screw-seated through the side-bar 4 into the standard-sockets; and the removable half-bearing blocks 15 and 16 bolted to the half-bearing blocks 1 and 2, thus forming bearings for the axle of the rolling-colter.

The rolling-colter B comprises the axle 17 mounted in the rolling-colter-bearings, the hub 18 rigid on the axle between the side-bars 3 and 4, and the cutting-disk 19 secured to one side of the hub.

The gage-wheel C comprises the hub 20 adapted to be secured rigidly to the land end of the axle 17, the web 21 integral with the hub, and the rim 22 integral with the web, the gage-wheel being smaller in diameter than the rolling-colter so that the gage-wheel will roll on the turf and limit the depth to which the rolling-colter will cut and so that the gage-wheel will act as a traction-wheel to assist in rotating the rolling-colter.

The trailer-wheel D comprises the standard 23 adjustably mounted in the standard-socket 10, the lower end of the standard being offset toward the land, the trunnion 24 fixed in the lower end of the standard and the wheel proper 25 upon the trunnion, so that the wheel will run upon the turf or land and support the rear end of the plow-beam, and so that the rear end of the plow-beam may be adjusted up and down.

The interchangeable plow-shares E are made to cut furrows of various widths, provision being made for carrying one or two out of use so that they may be readily changed, and each plow-share is provided with a standard 26, said standard fitting in the standard sockets 11, 12 and 13, and in operation a plow-share is selected suitable for the width of furrow desired. The set screws 14 hold the standards removably in place.

The handle F comprises the parallel arms 27 and 28 extending upwardly and backwardly from the forward ends of the side-bars 3 and 4, and having transverse slots 29 in their rear upper ends; the cross-piece 30 connecting the central portions of the arms 27 and 28, said arms and cross-piece being integral with the side-bars; the tongue 31 secured in place between the arms 27 and 28 by the pivot-bolt 32 inserted through the arms below their ends and through the extreme end of the tongue and by the adjusting-bolt 33 inserted through the slots 29 and through the tongue, so that the angle of the tongue may be changed to the limits of the slots; the U-shaped clip 34 on the upper rear end of the tongue and forming a transverse opening; and the handle-bar 35 inserted through the clip.

The adjustable guide G comprises the guide-bar 36 having longitudinal slots 37 and 38; the lower forward end of the guide-bar being shaped to form the standing-colter 39 adapted to run between the turf 40 and the side-walk 41 and cut the turf loose from the side-walk and guide the machine; the width-adjusting-screws 42 and 43 screw-seated horizontally through the arms 27 and 28 and having the handles 44 and 45 upon their land ends and having shoulders 46 near their opposite ends and having depth-adjusting-screws 47 and 48 beyond the shoulders and extending through the slots 37 and 38 in the guide-bar 36; the washers 49 against the shoulders inside of the guide-bar; and the depth-adjusting-nuts 50 and 51 upon the screws 47 and 48 outside of the guide-bar; so that the standing-colter and guide may be adjusted to and from the rolling-colter and up and down.

I claim:

1. In a gaged-lawn-edger a rolling-colter, a plow-beam mounted with its forward end upon the axle of the rolling-colter, a gage-wheel for supporting the forward end of the plow-beam, a trailer-wheel for supporting the rear end of the plow-beam, and interchangeable plow-shares adjustably mounted upon the plow-beam.

2. In a gaged-lawn-edger, a plow-beam, a gage-wheel for supporting the forward end of the plow-beam, a trailer-wheel for supporting the rear end of the plow-beam, a handle attached to the plow-beam, a rolling-colter rigid with the gage-wheel, and a plow-share adjustably attached to the plow-beam.

3. In a gaged-lawn-edger, a rolling-colter, a plow-beam mounted with its forward end upon the axle of the rolling-colter, a gage-wheel rigid upon the axle of the rolling-colter for supporting the forward end of the plow-beam, a trailer-wheel for supporting the rear end of the plow-beam, a plow-share upon the plow-beam, a handle extending upwardly and backwardly from the plow-beam, and a standing-colter and guide extending downwardly from the handle beside the rolling-colter.

4. In a gaged-lawn-edger, a plow-beam, a handle extending upwardly and backwardly from the plow-beam, a rolling-colter and gage-wheel at the forward end of the plow-beam, a gage-wheel at the rear end of the plow-beam, a plow-share carried by the plow-beam, a guide-bar having longitudinal slots, bolts extending through the handle and through the slots, and a standing-colter upon the lower forward end of the guide-bar.

5. In a gaged-lawn-edger, a plow-beam, a handle extending upwardly and backwardly from the plow-beam, a rolling-colter and gage-wheel at the forward end of the plow-beam, a gage-wheel at the rear end of the plow-beam, a plow-share carried by the plow-beam, adjusting screws adjustably mounted in the handle, a guide bar having longitudinal slots through which the adjusting screws extend, there being shoulders upon the adjusting screws, and nuts upon the adjusting screws, and a standing-colter upon the lower forward end of the guide-bar beside the rolling-colter, so that the standing-colter may be adjusted to and from the rolling-colter and up and down.

JOHN C. LINDSEY.

Witnesses:
 HELEN M. DRISCOLL,
 ESTELLE M. LE SAGE.